(12) United States Patent
Radermacher et al.

(10) Patent No.: US 8,159,454 B2
(45) Date of Patent: Apr. 17, 2012

(54) LED STRING DRIVER WITH SHIFT REGISTER AND LEVEL SHIFTER

(75) Inventors: Harald Josef Guenther Radermacher, Aachen (DE); Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 228 days.

(21) Appl. No.: 12/596,484

(22) PCT Filed: Apr. 21, 2008

(86) PCT No.: PCT/IB2008/051520
§ 371 (c)(1),
(2), (4) Date: Oct. 19, 2009

(87) PCT Pub. No.: WO2008/129504
PCT Pub. Date: Oct. 30, 2008

(65) Prior Publication Data
US 2010/0134041 A1   Jun. 3, 2010

(30) Foreign Application Priority Data
Apr. 24, 2007   (EP) .................................... 07106833

(51) Int. Cl.
*G09G 3/36*   (2006.01)
*H05B 41/16*   (2006.01)
(52) U.S. Cl. .......... 345/102; 345/211; 345/204; 345/98; 315/247; 315/291; 315/185 S; 315/312
(58) Field of Classification Search ............... 315/185 S, 315/247, 224, 291, 312–326
See application file for complete search history.

(56) References Cited

U.S. PATENT DOCUMENTS

| 6,153,980 | A | 11/2000 | Marshall et al. |
| 2003/0057886 | A1 | 3/2003 | Lys et al. |
| 2004/0090403 | A1 | 5/2004 | Huang |
| 2005/0232132 | A1 | 10/2005 | Ashdown et al. |
| 2006/0038803 | A1 | 2/2006 | Miller et al. |
| 2006/0125425 | A1 | 6/2006 | Yen |
| 2007/0257623 | A1* | 11/2007 | Johnson et al. ............... 315/193 |

FOREIGN PATENT DOCUMENTS

| DE | 10103611 A1 | 8/2002 |
| DE | 10358447 B3 | 5/2005 |
| EP | 1318701 A2 | 6/2003 |
| WO | 2006107199 A2 | 10/2006 |

* cited by examiner

*Primary Examiner* — Tuyet Thi Vo
(74) *Attorney, Agent, or Firm* — Mark L. Beloborodov

(57) ABSTRACT

The present invention relates to a device for individually driving OLED/LED elements of an OLED/LED string, comprising for each OLED/LED element of the string: a controllable shunting switch (22, 42) coupled with the respective OLED/LED element (14, 15), switch controller means (30, 44) for controlling said shunting switch (22, 42) and having a control output port coupled to said switch (22, 42), a data input port and a clock input port, level shifting means (32) assigned to said switch controller means (30, 44) and adapted to bring the control input data to a level sufficient to be accepted by the switch controller means (30, 44) during a programming mode and to allow the control of said shunting switch (22, 42). Said switch controller means (30, 44) of said OLED/LED elements (14, 15) are provided to form a serial-to-parallel converter means (31).

11 Claims, 6 Drawing Sheets

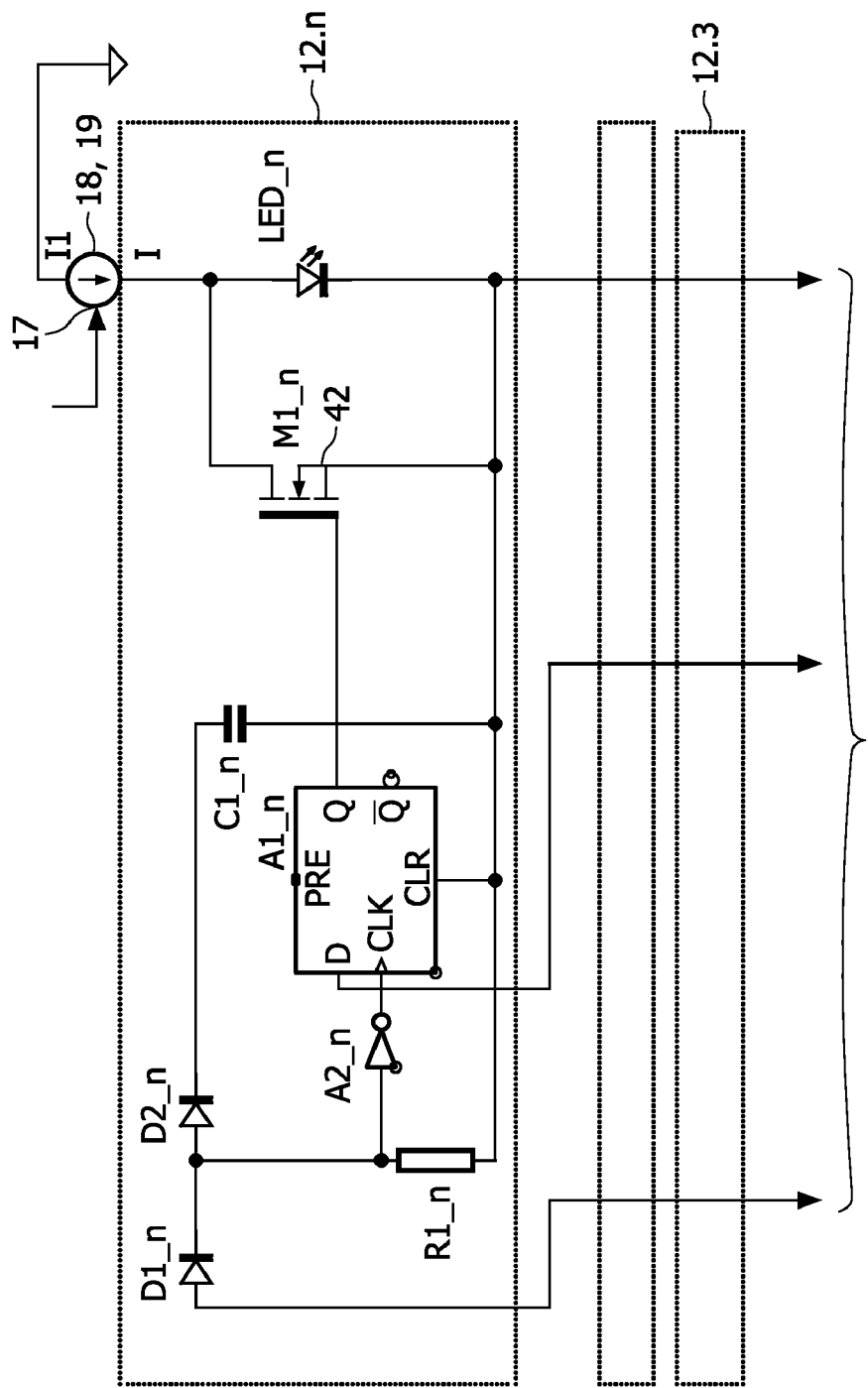

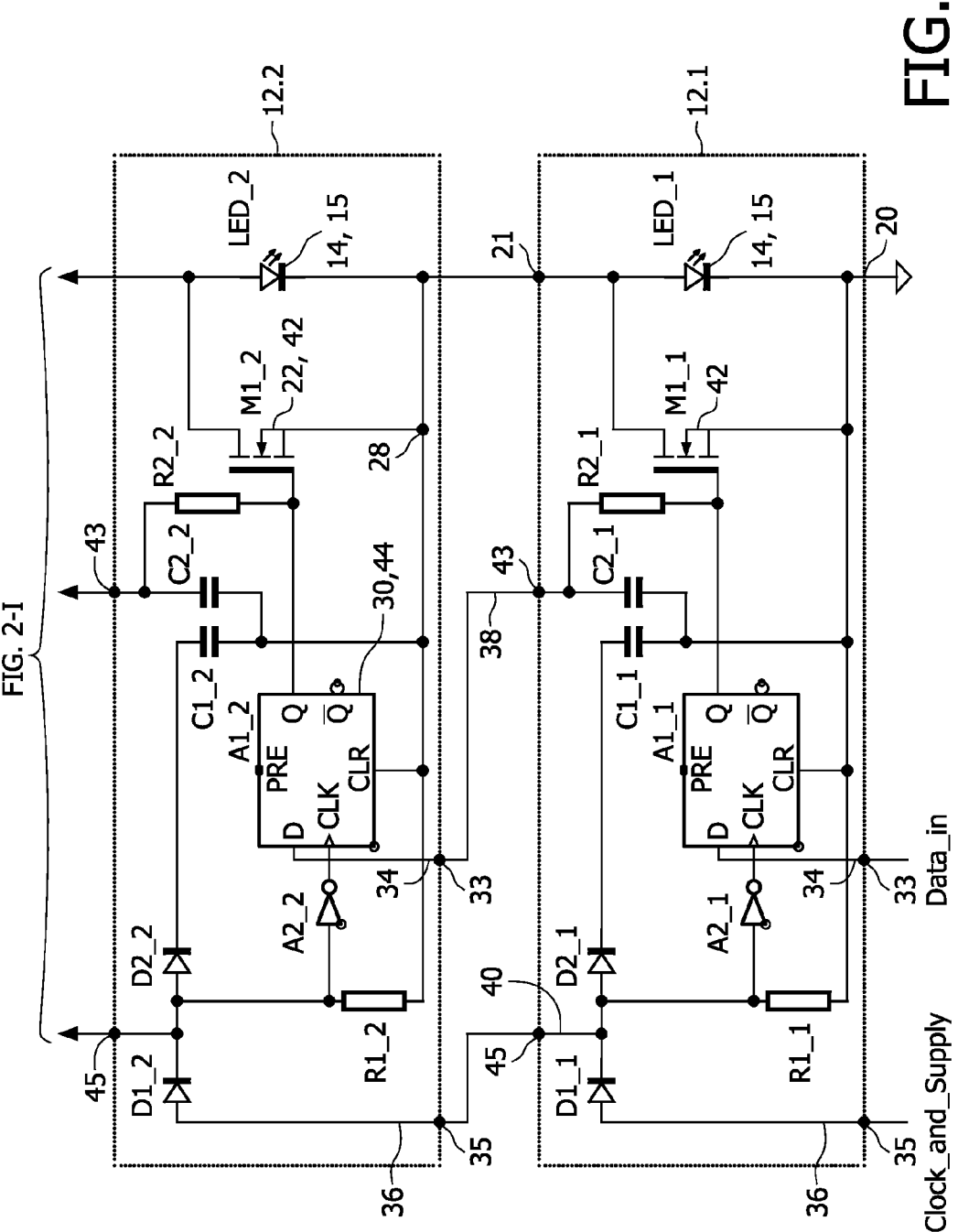
FIG. 2-II

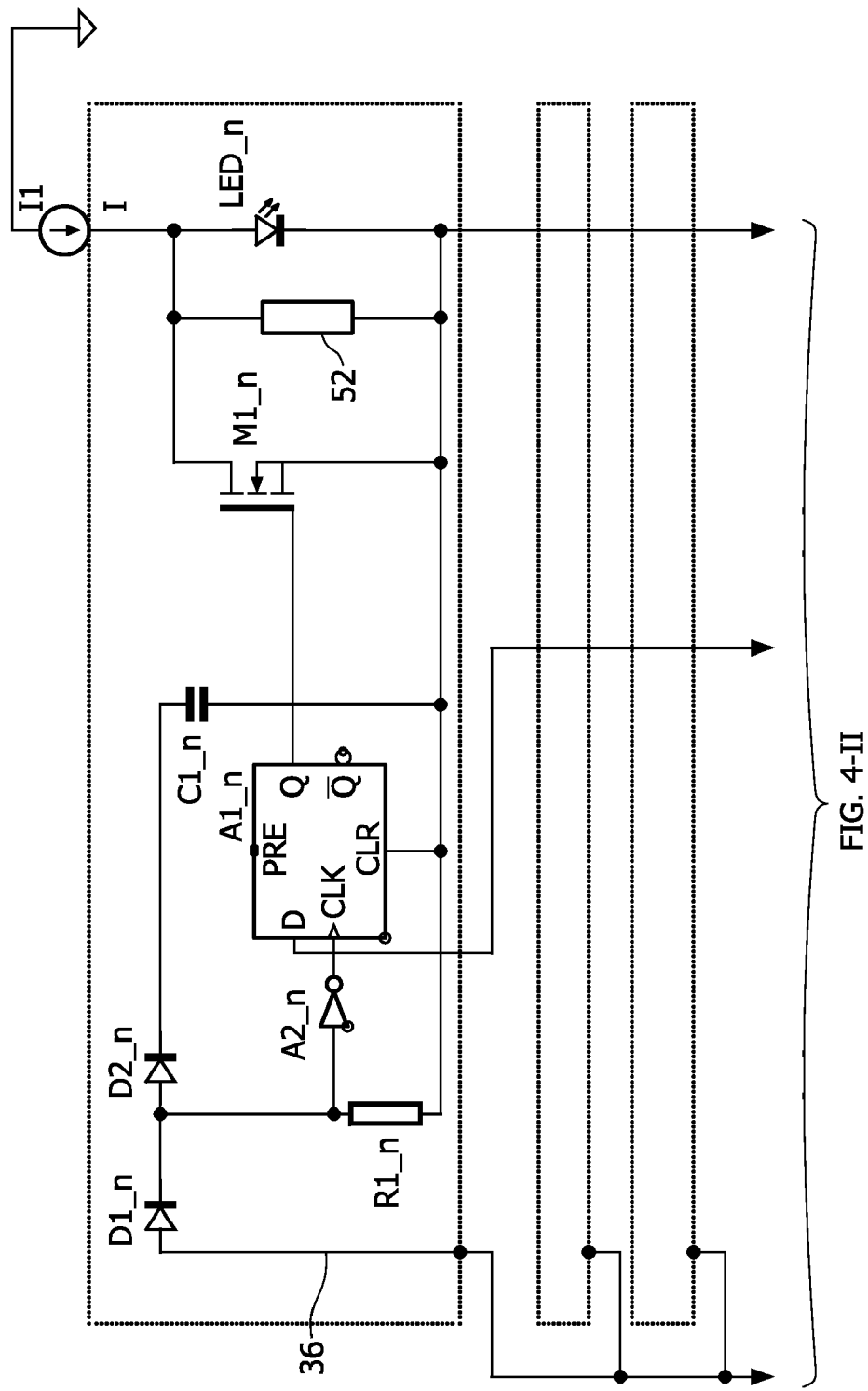
FIG. 4-I

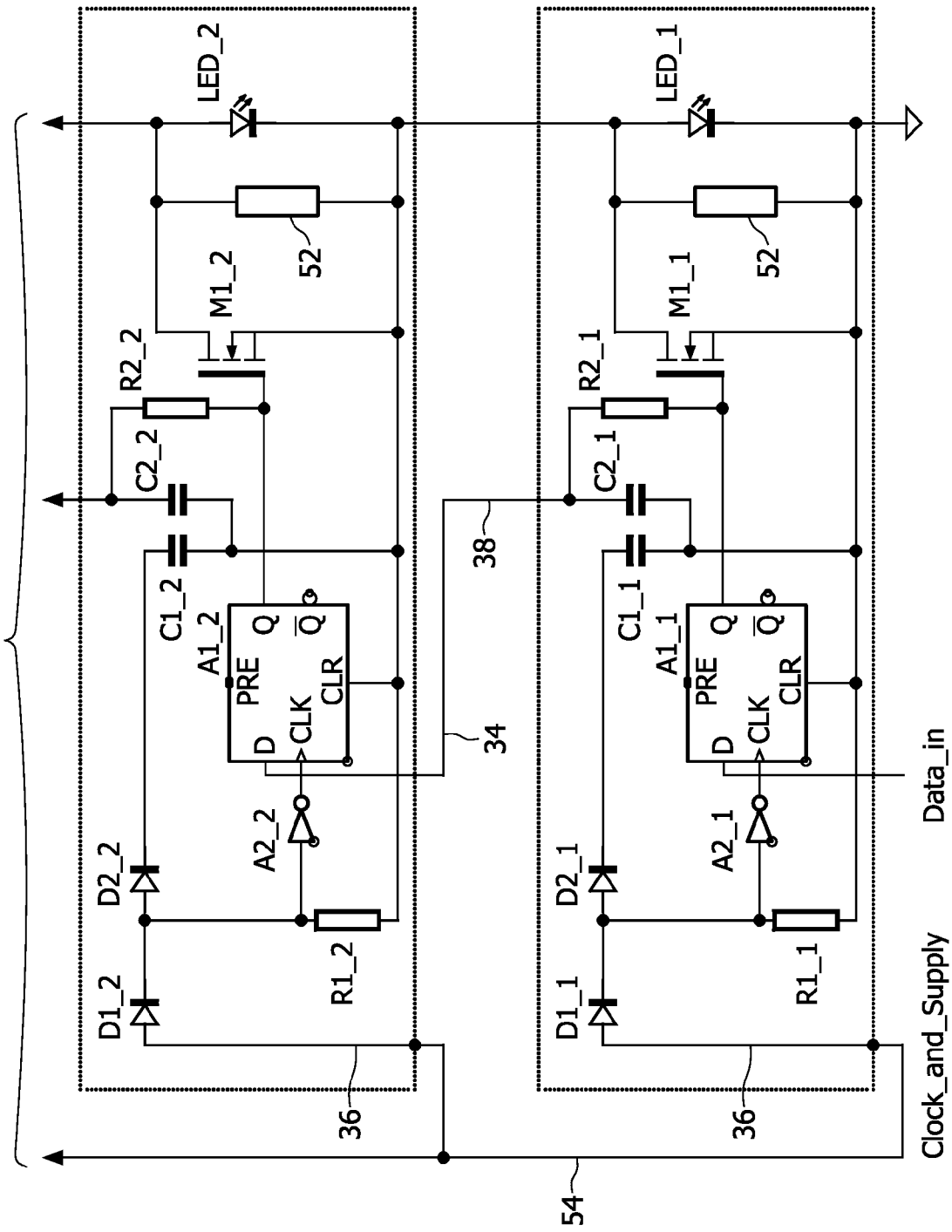
FIG. 4-II

LED STRING DRIVER WITH SHIFT REGISTER AND LEVEL SHIFTER

FIELD OF THE INVENTION

The present invention relates to a device for individually driving OLED/LED elements of an OLED/LED string. The invention also relates to a method of driving OLED/LED elements of an OLED/LED string individually.

BACKGROUND OF THE INVENTION

Lighting devices using LEDs or OLEDs (Organic Light Emitting Diode) gain more and more interest for general lighting applications. LEDs and OLEDs can be used to produce large amounts of light and have the benefit that they allow fast switching. On the one hand they can be used as general light sources, on the other hand they can be used as displays or design elements. In order to control the LEDs/OLEDs in a lighting device, so-called driver devices are used. In the art, there are a couple of solutions with respect to how to design such driver devices. For example, US 2006/0038803 A1 or WO 2006/107199 A2 disclose approaches regarding how to control LEDs coupled in series to form an LED string.

Generally, using a scanning matrix is the most obvious way to control a plurality of LEDs (or OLEDs) individually. However, the drawback is the low utilization of the individual LEDs. Due to multiplexing, only a fraction of the time cycle is used as activation time for each LED. Thus, the optical output of the LEDs will be lower than their nominal value. It is not possible to compensate for the dark time in larger setups, because in high power LEDs, the peak current is limited to a certain value.

In cases where only one string (i.e. a couple of LEDs arranged in one dimension, for example as a column or a row) is controlled, two possibilities are proposed in the art:

First, all LEDs can be connected to a common potential at one terminal, and the other terminal is switched. In this case, some current limiting means are necessary for each individual LED.

Second, it is possible to connect the LEDs in series. Here, only one current limiting block is required, but it is complicated to switch the individual LEDs due to their floating reference potential within the string.

SUMMARY OF THE INVENTION

With respect to the second possibility, it is an object of the present invention to provide a device which overcomes the above-mentioned problem and which is simple, cost-effective and scalable.

This and other objects are solved by the device for individually driving OLED/LED elements of an OLED/LED string, which comprises for each OLED/LED element of the string:

a controllable shunting switch coupled with the respective OLED/LED element, switch controller means for controlling said shunting switch and having a control output coupled to said switch, a data input port and a clock input port, level shifting means assigned to said switch controller means and adapted to bring the control input data to a level sufficient to be accepted by the switch controller during a programming mode and to allow the control of said shunting switch, said switch controller means of said OLED/LED elements being provided to form a serial-to-parallel converter means.

In other words, the inventive device is built up modularly and each OLED/LED element of the string is assigned one modular unit. Each modular unit comprises a switch controller means which is adapted to form one stage of a serial-to-parallel converter if the modular units are appropriately coupled in series with each other. The switch controller means of the modular units store the binary control value for controlling the respective shunting switch. Each switch controller means receives its control value by serially supplying the control values to the first modular unit of the device and clocking the serial data stream through the stages of the serial-to-parallel converter.

Since the individual OLED/LED elements of the string have floating reference potentials, each modular unit is arranged such that it includes the level shifting means which is adapted to align the potential of the switch controller means output signal and the reference point of the shunting switch which is coupled parallel to the OLED/LED element.

The inventive device allows to control OLED/LED elements of a string separately, e.g. switching the elements on and off. This feature enables the use of pixelated LED lamps without drawbacks with respect to efficiency. As mentioned, the inventive device includes three essential features, namely a serial-to-parallel converter to connect a string to a simple serial data source, the level shifting features which are required to drive a series connection of OLEDs/LEDs, and the shunting switch.

In case that the individual activation of the OLED/LED elements is not used, there are no additional losses due to the control electronics. In summary, the inventive device has the advantage that a very good efficiency may be achieved when it is used for a normal string of OLEDs/LEDs without individual control, and a very high utilization of the OLEDs/LEDs is achieved, when use is made of the individual addressing features.

It is to be noted that in the context of the present application the expression "LED" or "LED element" means on the one hand LED as well as OLED elements, and on the other hand not only one LED or OLED but also a series or parallel connection or a mixed series and parallel connection of two or more LEDs or OLEDs. Further "LED" also means laser diode or any other similar or related light element.

In a preferred embodiment, said shunting switches are switched on when said switch controller means are programmed by a serial data stream. In a preferred embodiment, the LED elements are switched off by setting the supply current to zero or to a small negative value during the programming mode, avoiding the activation of the LED elements when the control values are shifted through the stages of the serial-to-parallel converter.

In a preferred embodiment, said shunting switch is a transistor, preferably a field effect transistor. More preferably, said switch controller means is a D-latch circuit triggered via said clock input port. It is further preferred that said level shifting means comprises a capacitor and a first diode coupled in series and provided between a potential reference point of said latch means and its clock input port, said clock input port being supplied with a Clock_and_Supply signal via a second diode during programming of said serial-to-parallel converter means formed by said latch means. It is further preferred that a resistor is coupled between said clock input port of said latch means and said reference point.

In a preferred embodiment, said data input port of a latch means is coupled with said output port of the predecessor latch in order to form said serial-to-parallel converter.

In a preferred embodiment, a current limiting resistor is provided between the data input port of said latch means and the data output port of said predecessor latch means.

The aforementioned features have been proven advantageous in practice. However, it is to be noted that it is a preferred approach to designing the inventive device, but not the only design. Of course, the inventive concept may also be implemented differently.

The object of the present invention is also solved by a method of driving OLED/LED elements of an OLED/LED string individually, which method comprises the steps of:

providing a serial-to-parallel converter, providing a shunting switch for each OLED/LED element in the string, each shunting switch being assigned to a respective stage of said serial-to-parallel converter, programming said converter by supplying a serial datastream, said shunting switches being switched on during programming, and operating said string by supplying power to said string and controlling said shunting switches by the parallel output signals of the serial-to-parallel converter.

The inventive method achieves the same advantages as described with respect to the inventive device, so that for its description reference is made to the respective description above.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

Embodiments of the invention are shown in the drawings and will be explained in more detail in the description below with reference to same. In the drawings:

FIG. 2 shows a further implementation of the inventive device;

FIG. 4 is a further implementation of the inventive device.

DETAILED DESCRIPTION OF EMBODIMENTS

Figure 1:
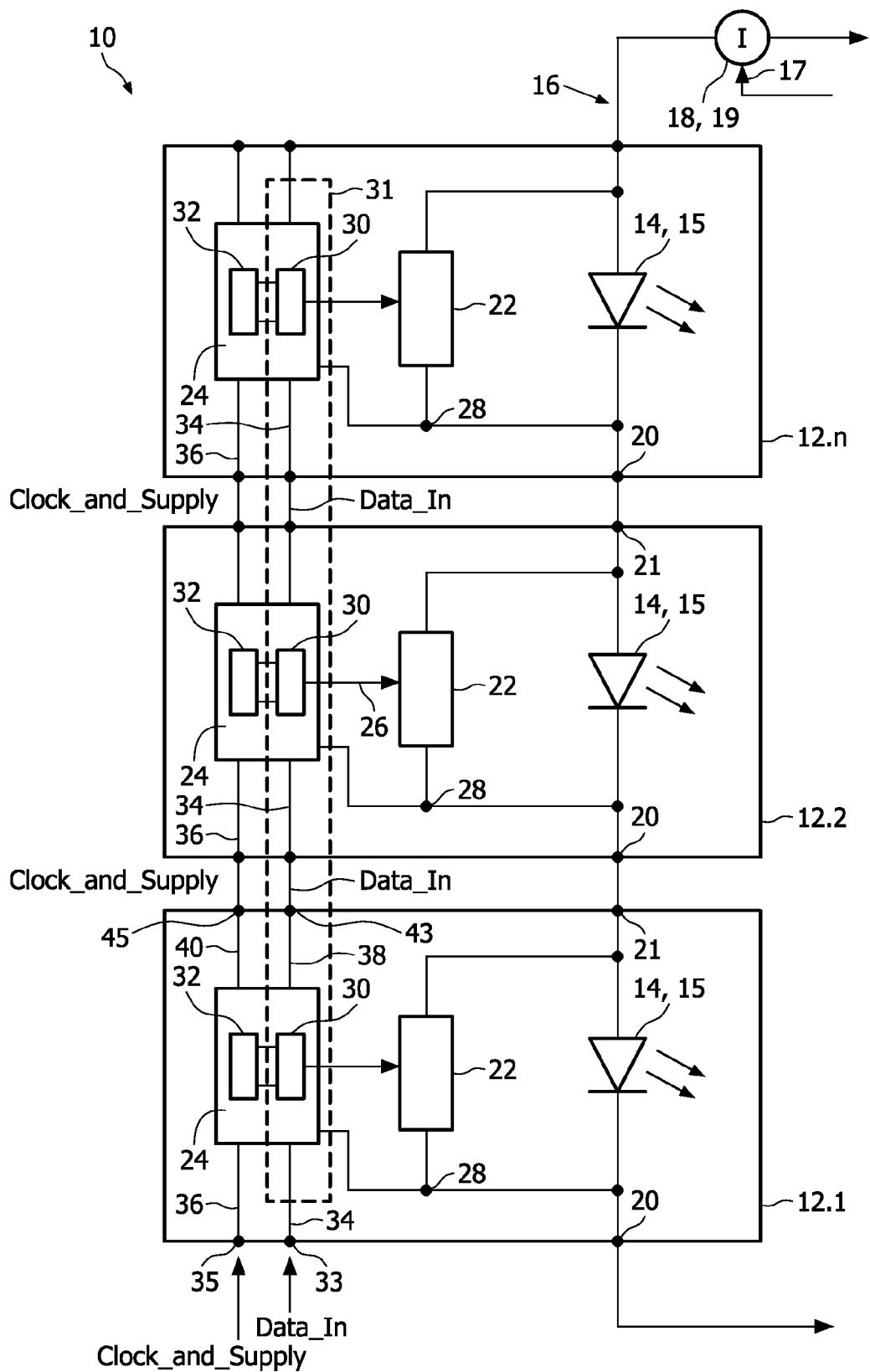
FIG. 1 schematically shows a device for individually driving LED elements of an LED string according to a preferred embodiment.

In FIG. 1, a driver device is schematically shown and indicated by means of reference numeral 10. The driver device 10 may be used for general illumination lamps with an enhanced control possibility or for pixelated lamps or to support spatial dimming or local highlighting in backlight and signage applications.

In particular, the driver device 10 is used in the shown embodiment to control light elements 14 which are coupled in series to form a string 16. The light elements 14 are provided as light emitting diodes 15 or organic light emitting diodes (OLED). Further, it is to be noted that each light element 14 may comprise one or more LEDs or OLEDs arranged in series, in parallel or a combination thereof. In the context of the following description, the expression LED 15 means generally a light element 14 of the afore-mentioned kind.

The LEDs 15 of the string 16 are powered by a power supply 18, which is for example a current source 19. The current source may be controlled via control signals supplied to a control input 17.

Each LED 15 in the string 16 is assigned a modular circuit 12.1-12.$n$ which serve to control the respective LED 15. The number of provided modular circuits 12 corresponds to the number of light elements 14 forming the string 16.

Since the modular circuits 12.1-12.$n$ are similarly constructed, the following description only refers to one modular circuit, namely the modular circuit 12.2.

The modular circuit 12.2 comprises a shunting switch 22 which is coupled parallel to the LED 15. The shunting switch 22 serves to bypass the LED 15 if the LED should be switched off. If it is desired that the LED radiates light, the respective shunting switch 22 is opened, i.e. switched off, so that no bypass exists. The supplied power may therefore reach the LED 15 to cause the radiation of light.

The shunting switch 22 is controlled by a control unit 24 which supplies a control signal via a control signal line 26 to the shunting switch 22. Further, the control unit 24 is electrically coupled with one side of the shunting switch 22 and with the cathode side of the LED 15 to have a common reference potential 28.

The control unit 24 comprises a register 30 for storing a control value applied via the control signal line to the shunting switch 22, and a level shifting element 32.

The register 30 is adapted to form one stage of a serial-to-parallel converter 31 with the other registers 30 of the modular circuits 12.1-12.$n$.

For realizing a serial-to-parallel converter, each register 30 has a Data_in input and a clock input, the data_out output being the control signal on the control signal line 26. As is known by a skilled person, the serial datastream supplied to a serial-to-parallel converter is shifted from stage to stage with each clock signal.

With respect to the embodiment shown in FIG. 1, the serial datastream is supplied to the first modular circuit 12.1 and is then transferred to the following modular circuits 12.2-12.$n$. Hence, the input of n data values takes n clock signals.

In order to pass the serial datastream from one modular circuit to the next, the modular circuits have Data_in ports 33 and Clock_and_Supply ports 35. Further, each modular circuit 12 has a Data_out port 43 and a Clock_and_Supply output port 45.

As is apparent from FIG. 1, the Data_in port 33 of a modular circuit is electrically coupled with the Data_out port 43 of the predecessor modular circuit. Further, the Clock_and_Supply input port 35 is electrically coupled with the Clock_and_Supply output port 45 of the predecessor modular circuit 12.

It is further shown in FIG. 1, that the respective ports of the modular circuit are connected via lines 34, 36, 38 and 40, respectively.

The control unit 24 comprises the level shifting element 32, as mentioned before, which is necessary, since the potential of the reference point 28 differs dependent on the position of the respective modular circuit within the string 16 and the status (on/off) of the LEDs. The level shifting element of each modular circuit 12 guarantees that the shunting switches 22 may be switched on and off although the reference potential of the respective LED is floating. The level shifting element 32 ensures that the potential of the reference point 28 and the control output of said register 30 is raised during normal operation (not during a programming mode).

As is also apparent from FIG. 1, each modular circuit comprises two LED ports 20, 21 between which the light element 14 is connected and which are coupled with succeeding modular circuits and the power supply 18, respectively, in order to achieve the illustrated series connection of n light elements 14 forming the string 16.

With respect to FIG. 2, a preferred embodiment of the device 10 is shown and will be described in detail below. Since the modular circuits 12.1-12.*n* are similarly designed, the structure of the modular circuit 12.2 will now be described in detail.

The shunting switch 22 is provided as a field effect transistor, preferably a MOSFET, 42, the drain of which is coupled with the anode of the LED 15 and the source is coupled with the cathode.

The register 30 is provided in form of a so-called D-latch 44 which is generally known in the art. The D-latch 44 has a data output Q which is coupled to the gate of the MOSFET 42. The data input port D of the D-latch 44 is connected with the Data_in port 33 to receive the data output of the predecessor circuit (here modular circuit 12.1).

Between the Clock_and_Supply port 35 and the reference point 28 of the modular circuit 12.2, a series connection of two diodes D1_2 and D2_2 and a capacitor C1_2 is provided. The bridging point between both diodes D1_2 and D2_2 is connected to an inverter A2_2, the output of which is connected to the clock input CLK of the D-latch 44. Further, a resistor R1_2 is coupled between the bridging point and the reference point 28. Finally, the CLR input of the D-latch 44 is also connected to the reference point 28.

As an alternative, the PRE-Input or the CLR-Input might be connected to a pulse-forming network deriving a pulse upon the appearance of a positive voltage at the bridging point between D1_n and D2_2. This would result in closing or opening the switch automatically and hence propagating this status throughout the complete serial connection automatically. This could be used to have a defined starting status for each data transmission and a defined charging of all capacitors C1_n The signal to be applied to the Clock_and_Supply output port 45 is taken from the bridging point between the diodes D1_2 and D2_2.

The Clock_and_Supply input port of the modular circuit 12.2 is coupled via the Clock_and_Supply line 36 with the anode of the diode D1_2.

In order to build up a serial-to-parallel converter, the output signal of the D-latch 44, namely the Q signal, is supplied via a resistor R2_2 to the Data_out port 43 which itself is connected to the Data_in port 33 of the successor modular circuit 12.3. Finally, between the Data_out port 43 and the reference point 28, a capacitor C2_2 is provided. This capacitor C2_2 serves for a dedicated delay in the signal propagation. Based on the speed of the logic devices used, it might be omitted.

Generally, the output of the D-latch 44 drives the MOSFET 42. Dependent on the signal (low or high) of the D-latch 44, the MOSFET is switched on or off. The capacitor C1_2 is provided to stabilize the supply voltage of the respective modular circuit 12. The supply voltage is referenced to the cathode side (reference point 28) of the LED 15. The clock signal portion of the Clock_and_Supply signal which is applied to the port 35, is derived, due to decoupling, with the diodes D1_2 and D2_2 and the pull-down resistor R1_2.

The driver device 10 shown in FIG. 2 operates as follows:

During a programming mode used to program the respective D-latches 44, a negative current $I_1<0$ is forced through the circuit which is caused by an appropriate control signal at the control input 17 of the current source. Thus, depending on the previous switch status either the MOSFET is conducting in reverse direction or the body diodes of the MOSFETs 42 of the modular circuits 12 are conducting. In either case, all LEDs 15 are switched off. Using the aforementioned pulse-forming network to clear the latches (using the CLR-input), the situation described in the following can be achieved. A positive voltage $V_{cc}$ is applied to the Clock_and_Supply port 35 of the first modular circuit 12.1. Via the diodes D1_1 . . . D2_n, the supply voltage capacitors of the modules (C1_n) are recharged to $$V_{supply}=V_{cc}-V_f$$

where $V_f$ is the forward voltage of the diode type used for D2_x. This supply voltage is nearly equal for each modular circuit. With an appropriate selection of the diode type used for D1_x and the negative current $I_1$, the voltage drop across the body diodes of the MOSFETs 42 and the voltage drop across the diode D1_x is the same and, thus, they cancel each other out.

At each clock input CLK (across R1_x), there is a high level.

Then a datum (control value) is applied to the Data_in port 33 of the first modular circuit 12.1. Next, the Clock_and_Supply signal is set to 0 V. Thus, the data at the input of each modular circuit (Data_in) is copied to the output of each D-latch 44. Due to the delay related to the speed of the logic (represented or intentionally created by the RC network R2_x, C2_x), each modular circuit copies the data present at the falling edge of the Clock_and_Supply port to its output Q.

Of course, there is a potential difference between two neighboring modular circuits which are sending and receiving the shifted data. But this shift cannot exceed the voltage drop of one body diode (~0.5 V). A high level outputted from modular circuit 12.*x* can easily be read as high from block x+1 (e.g. $V_{cc}$=5 V, CMOS_high=4.95 V, will result in 5.45 V input signal for the upper modular circuit). A low level (CMOS_low=0.05 V) will be 0.45 V for the upper modular circuit. Usually, all logic devices have clamping diodes from the signal terminals to both supply and reference potential. Using a simple current limiting resistor (e.g. the R2_x shown in FIG. 2) will allow safe and stable operation.

Then, the Clock_and_Supply signal at port 35 of modular circuit 12.1 is set to $V_{cc}$ again. A new datum is applied to the Data_in port 33 of the modular circuit 12.1. The cycle mentioned above repeats, and the serial data stream at the Data_in port 33 of modular circuit 12.1 is parallelized over the other modular circuits 12.2-12.*n*. At each falling edge of Clock_and_Supply input signal, the data is shifted up one modular circuit, meaning from 12.*x* to 12.*x*+1.

When all the desired information is clocked into the latches 44 (typically after n clock cycles, when all latches are updated), the Clock_and_Supply input is kept at 0 V.

Then, the programming mode is left by applying a respective control signal to the current source 18, and setting the current source to a positive current $I_1>0$, which is the desired forward current of the LEDs 15. Within each block, the current $I_1$ will flow either through LED 15 if a "0" is stored in the latch 44 and the MOSFET 42 is open, or through MOSFET 42, if the latch 44 was programmed to "1".

Due to the forward current in the LEDs 15 or the MOSFETs 42, there will be positive voltage drops across each modular circuit. The data signal is not monitored during this operation and anyway is in the allowed input voltage range or protected due to the current limiting resistor R2_x described above. All reference potentials 28 will be positive with respect to GND, so the Clock_and_Supply signal is low (or negative) for each modular circuit. The negative voltage is blocked by the diodes D1_x. There is no transition on the clock input of the driver device, and the latched information in the latches 44 is kept stable.

For a change in the states of the LEDs, the complete cycle as mentioned above is repeated, starting with the setting of a negative current and followed by the clocking of new data into the structure.

Figure 3:
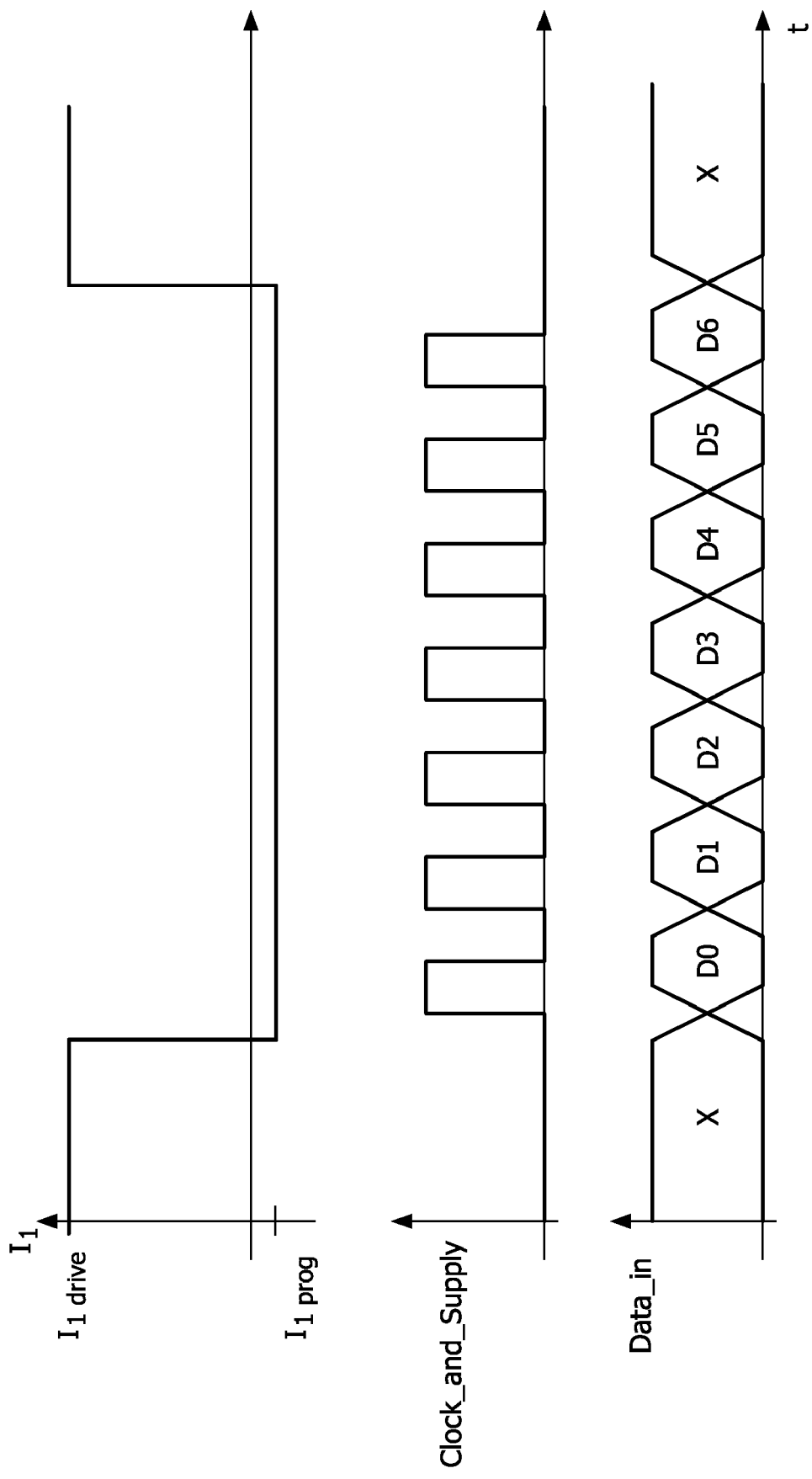
FIG. 3 is a signal diagram showing the programming sequence of the device of FIG. 2.

The programming sequence mentioned above is shown in FIG. 3, for an example of seven modular circuits 12.1-12.7. When the current is set to $I_1>0$, LED_1 . . . LED_n will be lit according to the inverted data D6 . . . D0. The length of the clocking interval scales with the number of LEDs. The data source could control several LED strings 16 when generating one Clock_and_Supply signal and several data_in signals at the same time. In that way, an easy control of display light elements is possible.

A slightly modified embodiment of the driver device 10 shown in FIG. 2 is illustrated in FIG. 4. The main difference is that the Clock_and_Supply signal is set in parallel with all modular circuits 12.1-12.*n*. Hence, the modular circuits 12 do not have the Clock_and_Supply output port 45 any more. In other words, the Clock_and_Supply signal enters each modular circuit but does not leave it after D1_x. This results in a slightly different distribution of the electrical potential during the programming mode. In this case, it would be required to place a bypassing resistor 52 across the LED 15 and set the current source to zero (and not to a negative current) during programming.

As already mentioned, the inventive driver device is applicable as an enhanced control possibility for generating illumination lamps or as a core functionality for pixelated lamps, or to support spatial dimming or local highlighting in backlight and signage applications.

The invention claimed is:

1. Device for individually driving OLED/LED elements of an OLED/LED string, comprising for each OLED/LED element of the string:
   a controllable shunting switch coupled with the respective OLED/LED element,
   switch controller means for controlling said shunting switch and having a control output port coupled to said switch, a data input port and a clock input port, and
   level shifting means assigned to said switch controller means and adapted to bring the control input data to a level sufficient to be accepted by the switch controller means during a programming mode and to allow the control of said shunting switch, wherein said switch controller means of said modular units are coupled in series to shift the control input data to the switch controller means of the respective subsequent modular unit and to form a serial-to-parallel converter means, wherein said switch controller means is a D-latch circuit triggered via said clock input port (CLK).

2. Device of claim 1, wherein said shunting switches are switched off when said switch controller means are programmed by a serial data stream.

3. Device of claim 1, wherein said shunting switch is a transistor.

4. Device of claim 1, wherein said inverter means (A2_x) are assigned to the clock input port of each latch means to invert the clock input signal.

5. Device of claim 1, wherein said data input port of a latch means is coupled with said output port of the predecessor latch in order to form said serial-to-parallel converter.

6. Device of claim 5, wherein a current limiting resistor is provided between the data input port of said latch means and the data output port of said predecessor latch means.

7. Device of claim 1, wherein said level shifting means comprises a capacitor and a first diode coupled in series and provided between a potential reference point of said latch means and its clock input port, wherein said clock input port is supplied with a clock and supply signal via a second diode during programming of said serial-to-parallel converter means formed by said switch controller means.

8. Device of claim 7, wherein said clock and supply signal is provided by the second diode of the predecessor level shifting means.

9. Device of claim 7, wherein said clock and supply signal is supplied to the second diode of each level shifting means, and each OLED/LED element is assigned a resistor serving as a bypass during programming.

10. Device for individually driving OLED/LED elements of an OLED/LED string, comprising for each OLED/LED element of the string:
    a controllable shunting switch coupled with the respective OLED/LED element,
    switch controller means for controlling said shunting switch and having a control output port coupled to said switch, a data input port and a clock input port, and
    level shifting means assigned to said switch controller means and adapted to bring the control input data to a level sufficient to be accepted by the switch controller means during a programming mode and to allow the control of said shunting switch, wherein said switch controller means of said modular units are coupled in series to shift the control input data to the switch controller means of the respective subsequent modular unit and to form a serial-to-parallel converter means, wherein said data input port of a latch means is coupled with said output port of the predecessor latch in order to form said serial-to-parallel converter.

11. Device for individually driving OLED/LED elements of an OLED/LED string, comprising for each OLED/LED element of the string:
    a controllable shunting switch coupled with the respective OLED/LED element,
    switch controller means for controlling said shunting switch and having a control output port coupled to said switch, a data input port and a clock input port, and
    level shifting means assigned to said switch controller means and adapted to bring the control input data to a level sufficient to be accepted by the switch controller means during a programming mode and to allow the control of said shunting switch, wherein said switch controller means of said modular units are coupled in series to shift the control input data to the switch controller means of the respective subsequent modular unit and to form a serial-to-parallel converter means, wherein said inverter means are assigned to the clock input port of each latch means to invert the clock input signal.

* * * * *